(12) United States Patent
Barkan

(10) Patent No.: US 11,588,837 B2
(45) Date of Patent: *Feb. 21, 2023

(54) SECURED AUTOMATED OR SEMI-AUTOMATED SYSTEM

(71) Applicant: Mordecai Barkan, Palo Alto, CA (US)

(72) Inventor: Mordecai Barkan, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/536,565

(22) Filed: Nov. 29, 2021

(65) Prior Publication Data

US 2022/0086177 A1    Mar. 17, 2022

Related U.S. Application Data

(63) Continuation of application No. 15/675,611, filed on Aug. 11, 2017, now Pat. No. 11,223,634.

(51) Int. Cl.
| | | |
|---|---|---|
| *H04L 29/06* | (2006.01) | |
| *H04L 9/40* | (2022.01) | |
| *G06F 21/56* | (2013.01) | |
| *G06F 21/57* | (2013.01) | |
| *G06F 21/55* | (2013.01) | |
| *H04W 12/128* | (2021.01) | |
| *H04W 4/44* | (2018.01) | |

(52) U.S. Cl.
CPC ........ *H04L 63/1416* (2013.01); *G06F 21/554* (2013.01); *G06F 21/561* (2013.01); *G06F 21/566* (2013.01); *G06F 21/57* (2013.01); *H04L 63/145* (2013.01); *H04L 63/1408* (2013.01); *H04L 63/1441* (2013.01); *H04W 12/128* (2021.01); *H04W 4/44* (2018.02)

(58) Field of Classification Search
CPC ............. H04L 63/1416; H04L 63/1408; H04L 63/1441; H04L 63/145; G06F 21/554; G06F 21/561; G06F 21/566; G06F 21/57; H04W 12/128; H04W 4/44

See application file for complete search history.

(56) References Cited

U.S. PATENT DOCUMENTS

| | | | | |
|---|---|---|---|---|
| 5,233,512 A | * | 8/1993 | Gutz ..................... | G05B 9/02 318/563 |
| 5,384,697 A | * | 1/1995 | Pascucci ................ | G06F 9/54 707/E17.032 |
| 5,482,314 A | * | 1/1996 | Corrado ................ | G06V 20/593 701/45 |
| 6,026,340 A | * | 2/2000 | Corrado ................ | B60R 21/01536 701/47 |

(Continued)

OTHER PUBLICATIONS

Software Updating in Wireless Sensor Networks |https:/Avww.researchgate.net/publication/284442111_Software_Updating_in_Wireless_Sensor_Networks_A_Survey_and_Lacunae|pp. 718-760|2013|Brown et al. (Year: 2013).*

*Primary Examiner* — Mahfuzur Rahman
(74) *Attorney, Agent, or Firm* — Mordecai Barkan

(57) ABSTRACT

Secured automated or semi-automated systems are provided herein. In one embodiment, a sensor system includes a sensor, a legacy computing environment that is configured to communicate with the sensor and process sensor raw data output, and transmit the processed sensor output to a first network node over the network, and a trusted computing environment configured to receive raw sensor output directly from the sensor and transmit the raw sensor output to an additional network node or the first network node over the network.

1 Claim, 7 Drawing Sheets

(56) References Cited

U.S. PATENT DOCUMENTS

| | | | | |
|---|---|---|---|---|
| 8,056,134 | B1 * | 11/2011 | Ogilvie | G06F 21/566 |
| | | | | 713/188 |
| 8,073,008 | B2 * | 12/2011 | Mehta | A61M 5/142 |
| | | | | 370/468 |
| 2003/0025599 | A1 * | 2/2003 | Monroe | G08B 13/19691 |
| | | | | 709/200 |
| 2003/0093187 | A1 * | 5/2003 | Walker | B64D 45/0059 |
| | | | | 701/1 |
| 2004/0073404 | A1 * | 4/2004 | Brooks | G05B 19/409 |
| | | | | 702/183 |
| 2004/0075566 | A1 * | 4/2004 | Stepanik | G01N 33/0075 |
| | | | | 340/870.3 |
| 2005/0254996 | A1 * | 11/2005 | Haupt | G01N 33/0036 |
| | | | | 422/606 |
| 2013/0031042 | A1 * | 1/2013 | Dehnie | H04L 63/1416 |
| | | | | 706/47 |
| 2014/0226010 | A1 * | 8/2014 | Molin | G08G 1/20 |
| | | | | 340/576 |
| 2014/0336984 | A1 * | 11/2014 | Starr | G05B 23/0297 |
| | | | | 702/183 |
| 2016/0019777 | A1 * | 1/2016 | Peterson | G08B 17/10 |
| | | | | 340/506 |
| 2017/0054594 | A1 * | 2/2017 | Decenzo | H04L 67/12 |
| 2018/0197387 | A1 * | 7/2018 | Dawes | H04W 4/38 |

* cited by examiner

SECURED AUTOMATED OR SEMI-AUTOMATED SYSTEM

CROSS REFERENCE TO RELATED APPLICATIONS

This non provisional patent application is a continuation of and claims benefit to U.S. Non-Provisional application Ser. No. 15/675,611, filed on Aug. 11, 2017, titled "Secured Automated or Semi-Automated Systems", which is a continuation of and claims benefit to U.S. Non-Provisional application Ser. No. 15/061,878, filed on Mar. 4, 2016, titled "Secured Automated or Semi-Automated Systems", now U.S. Pat. No. 9,781,141 issued Oct. 3, 2017 which is a continuation of and claims benefit to U.S. Non-Provisional application Ser. No. 14/517,636, filed on Oct. 17, 2014, now U.S. Pat. No. 9,342,695 issued May 17, 2016, which is a continuation-in-part of and claims benefit to U.S. Non-Provisional application Ser. No. 14/040,352, filed Sep. 27, 2013, now U.S. Pat. No. 9,092,628 issued Jul. 28, 2015 which claims benefit to U.S. Provisional Application No. 61/744,677, filed Oct. 2, 2012. U.S. Non-Provisional application Ser. No. 14/517,636, filed on Oct. 17, 2014, now U.S. Pat. No. 9,342,695, issued May 17, 2016, also claims benefit to U.S. Provisional Application No. 61/961,547, filed Oct. 18, 2013. The subject matter of the aforementioned applications is incorporated by reference in their entirety, including all references cited therein.

FIELD OF THE TECHNOLOGY

Embodiments of the disclosure relate to security of networked sensors and actuators computerized system. More specifically, but not by way of limitation, the present technology provides secure networked computing systems architectures and applications. In some embodiments, the present technology employs both trusted and legacy hardware environments that protect sensitive information and increase data security, privacy, and safety allowing for high quality authentication of processed and control data.

SUMMARY

According to some embodiments, the present technology is directed to a sensor system, comprising: (a) a sensor; (b) a legacy computing environment that is configured to: (i) communicate with the sensor and process sensor raw data output; and (ii) transmit the raw sensor output to a first network node over the network; and (c) a trusted computing environment configured to: (1) receive raw sensor output directly from the sensor; and (2) transmit the raw sensor output to an additional network node or the first network node over the network.

According to some embodiments, the present technology is directed to an actuator system, comprising: (a) an actuator; (b) a legacy computing environment coupled with the actuator, the legacy computing environment configured to: (i) process input commands into actuator commands, for the actuator; and (ii) process the input commands and actuator state sensor raw data output to optimize actuator response; and (c) a trusted computing environment coupled to the actuator, the trusted computing environment configured to: (i) receive raw actuator state sensor output directly from the actuator; and (ii) transmit raw actuator state sensor output to the network node over the network.

According to some embodiments, the present technology is directed to a network node, comprising: at least a trusted computing environment that carries out secured processing and that communicates with other trusted computing environments or system nodes over the network, the system nodes comprising any of controllers, servers, or manned stations for monitoring or maintenance of actuators and sensors.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Weaknesses of automated systems from utility infrastructures to cars and attacks on ICS (Industrial Control Systems) such as those involving the Stuxnet malware, have been known to cause irreparable damage. For example, in Iran, the Stuxnet virus damaged nuclear centrifuges. Many other demonstrations and attacks (or attempts) have led to executive actions to harden national and private infrastructure to protect against cyber-attacks.

ICS and networked automated systems need a major rebuild that is not solved with current efforts. Key to securing a computerized system is separation of I/O (Input and Output), in a secured manner, from the processing sections of a networked computing system that may be contaminated by malware from a network. This separation may be implemented in different ways, depending on design considerations as set by requirements and device limitations. By this separation, authentication of information related to the user or computing components of a computing system are achieved with high reliability, allowing for containing malware from causing permanent damage, which results in defeat hacking at its source.

The present technology may be implemented in some or all computerized components of an Industrial Control System (ICS). This present technology is related to automated or semi-automated systems in which authentication of data measurements and verification of response to commands is critical to system operation.

Such system may include infrastructure systems such as electrical grid, nuclear reactors, water treatment, flood warning, transportation, and all other system that serve the community. It may be incorporated in military systems, ships, plans, vehicles, autonomous vehicles, RPVs, communication systems, and many more. The present technology may find great use in cars, home automation, robotics, networked medical devices, and others.

The present technology may be encapsulated in the addition of a trusted environment to computerized component of the system. By creating a trusted communication system and accordingly applications (programs) that authenticate the data sensed by sensors and confirm that actuators follow of the commands generated by the control programs.

The modifications presented with the present technology are allowing for safe and trusted links to communicate raw sensors and actuators data. By comparing such data with the output of control programs several functions may be fulfilled effectively: Monitoring, detection, containment, blocking, and recovery of malfunctioning endpoints (sensors and actuators) due mainly to malware attacks.

The networked system created by the trusted environments incorporated in the network components could be viewed as a trusted network to which the legacy components are connected.

The architecture may be also used to test the system in real time to assure safe operation, free of malware or defects in general.

Figure 6:
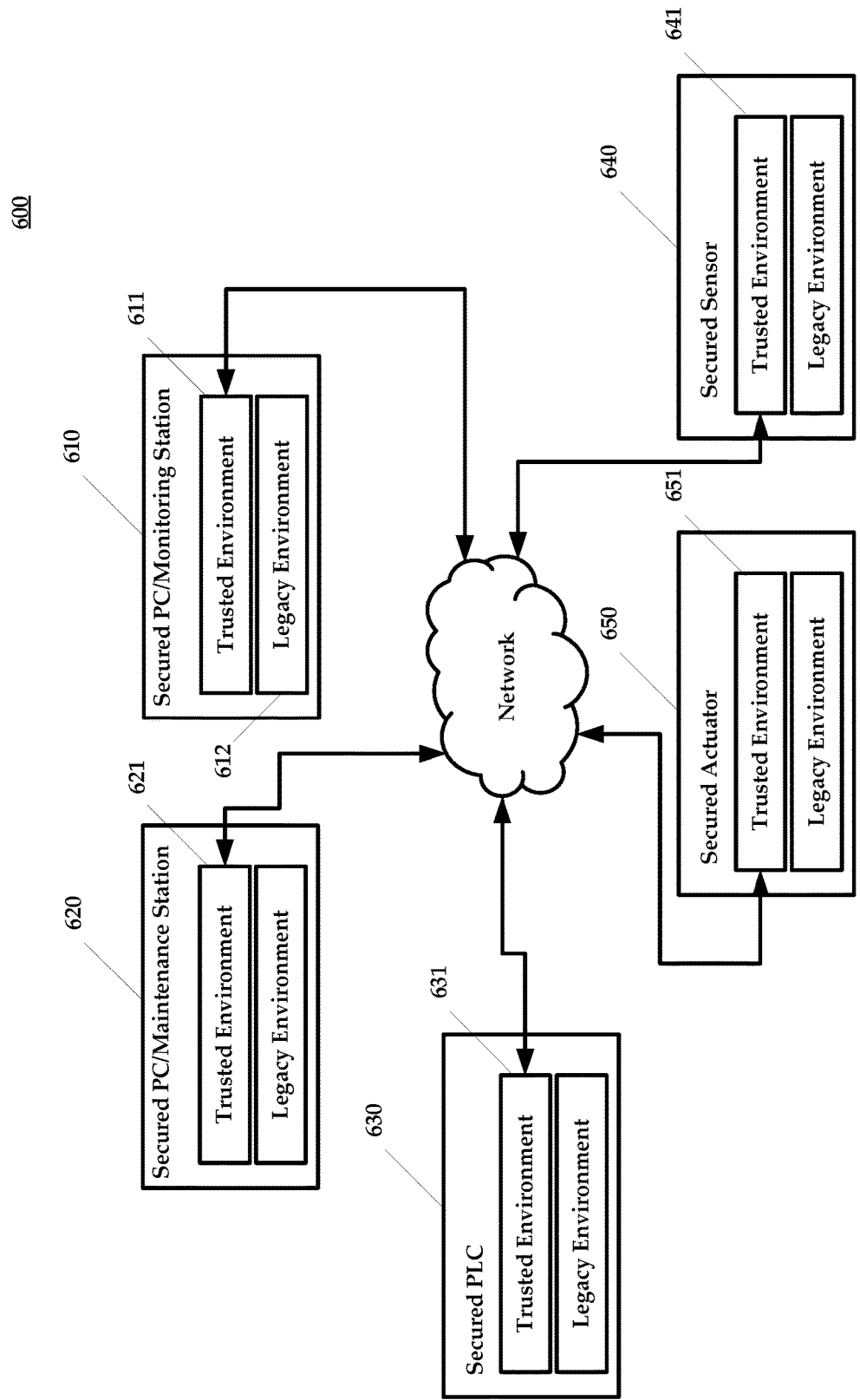
FIG. 6 is a schematic diagram of an example secured industrial control system (ICS), constructed in accordance with the present technology.

The present technology secures ICS and other automated networked computing units (see FIG. 6). The present technology allow for current ICS systems that incorporate sensors, actuators, and control mechanisms to incorporate the advantages of the present technology as components of a computerized system. This is accomplished by adding to each existing computing unit (referred to as a "legacy computing environment") the hardware and software (or firmware) that provides the unit the functions that enable the security functions to best fit and secure the system. This is accomplished by coupling the legacy computing environment with a trusted computing environment that is immune from malware.

The present technology supports the following non-limiting set of functions such as monitoring, detection, containment, blocking, recovery, and testing. These functions relate to sensors, actuators, networks, control and management systems, as well as other computing systems described herein.

The present technology includes hardware and software (firmware) that is incorporated or added to the legacy computerized components of a system. These incorporated types of hardware and/or software comprise the trusted computing environments. In some embodiments, a trusted computing environment is connected directly to a network into which the legacy computing environment is connected.

Modified computing components, having both legacy and trusted computing environments, are structured to allow for direct access to raw measurements of system components such as sensors and actuators in a safe manner (e.g., without potential contamination from the infected programmable part of the legacy computing environment), by an incorporated trusted computing environment. In one embodiment, the trusted computing environment is a separate physical block that is connected directly to the digital output of sensing elements in sensor and actuator systems.

Based on the actual implementation, the trusted computing environment may communicate directly with other trusted units on the network of which some may include trusted computing environments. Various architectures support different functions as depicted in details in the following figures.

Figure 1:
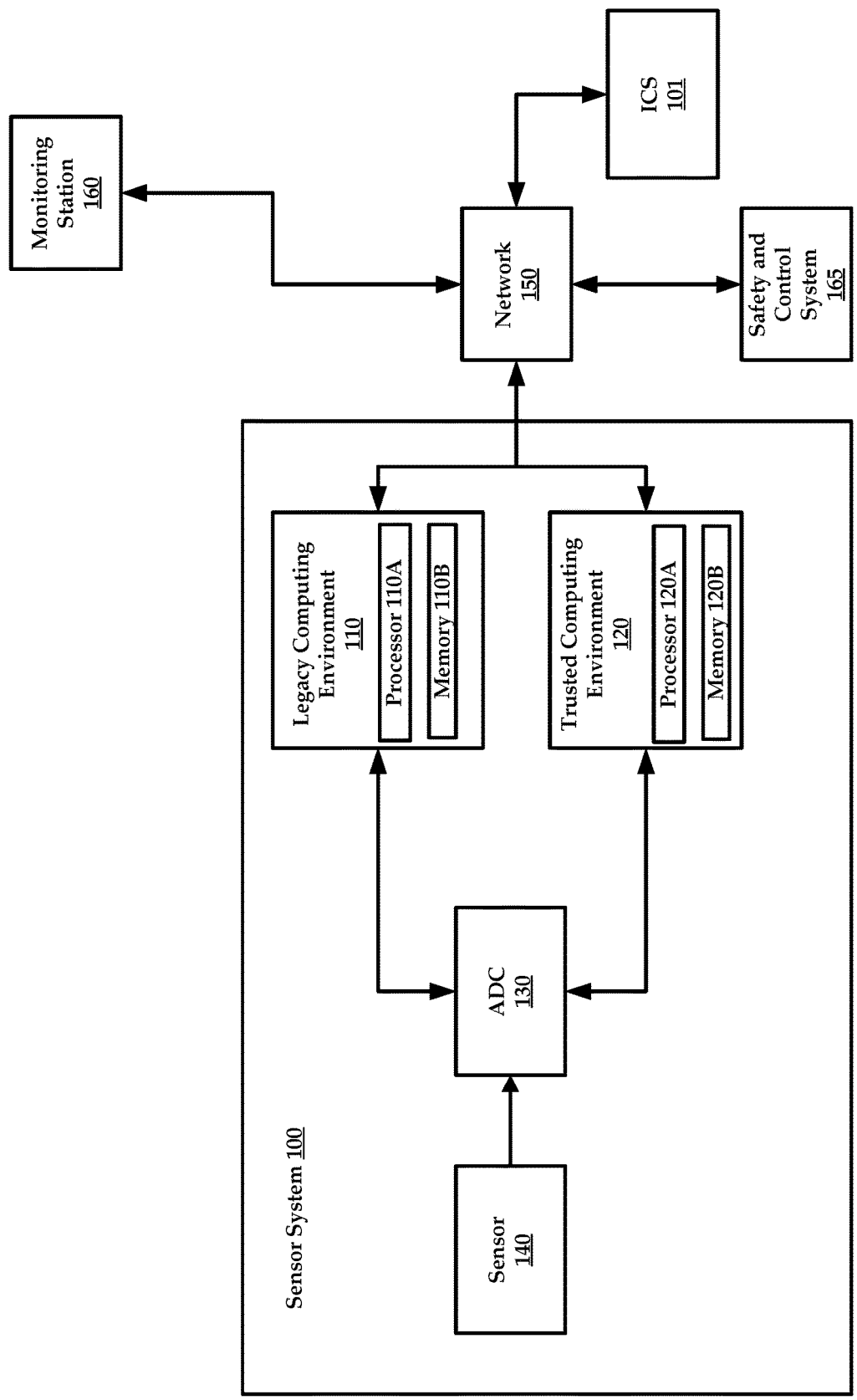
FIG. 1 is a schematic diagram of n example a sensor system, constructed in accordance with the present technology.

FIG. 1 depicts a basic architecture of a sensor system 100, constructed in accordance with the present disclosure. The system 100 comprises a legacy computing environment 110, a trusted computing environment 120, an analog to digital converter (ADC) 130, a sensor 140, and a network 150. The sensor system 100 is associated with an ICS system 10 or any other networked system that requires one or more sensors. The ICS 10 can incorporate the entirety of the sensor system 100.

Generally, the sensor 140 can include any sensing means such as temperature sensors, light sensors, pressure sensors, proximity sensors, voltage sensors, speed sensors, vibration sensors, as well as any other analog sensor that would be known to one of ordinary skill in the art.

The legacy computing environment 110 is configured to communicate with the ADC 130 and process sensor raw data output. For example, the legacy computing environment 110 can convert the raw data output into a format that is recognized. In one example, the raw data output is converted to measured degrees Celsius when the sensor 140 is a temperature sensor. In one embodiment, the legacy computing environment 110 comprises at least a processor 110A and memory 110B. The memory 110B can comprise instructions that allow the legacy computing environment 110 to process raw data from the sensor 140, converting the raw data into a usable output. Again, the raw data can come directly from the sensor 140 through the ADC 130, in some embodiments. Generally the legacy computing environment 110 is a microprocessor or system-on-a-chip that controls the sensor 140.

The legacy computing environment 110 is also configured to transmit raw sensor output to a first network node, such as the monitoring station 160, over the network 150. To be sure, the network 150 can include a local or public network. In one embodiment, the network 150 includes the Internet.

In one embodiment, the trusted computing environment 120 is configured to receive raw sensor output directly from the sensor 140 via the ADC 120, and transmit the raw sensor output to an additional network node or the first network node over the network 150. The additional network node could include a safety and control system 165. Using the safety and control system 165, a system administrator can monitor and evaluate the raw output and look for anomalies in the raw output, such as large fluctuations or erratic data patterns. In one embodiment, the trusted computing environment 120 comprises at least a processor 120A and memory 120B.

That is, most malware requires a certain amount of storage capacity in memory of a target computing device in order to infect the computing device. In one embodiment, the memory 120B includes only enough memory to store duplicate instructions for the legacy computing environment 110 or simple reboot routines/procedures that can be used to clean the legacy computing environment 110, as will be described in greater detail infra.

A typical sensor system does not include the trusted computing environment 120 that is added to the legacy computing environment 110. That is, the legacy computing environment 110 is usually combined with the sensor 140 and the ADC 130 forming a typical sensor system.

The trusted computing environment 120 operates in parallel to the legacy computing environment 110 which comprises a computing capacity (such as a processor 120A and memory 120B). The trusted computing environment 120 is added to a legacy sensor system and allows for transmission of raw data and communication via the network to control and a monitoring station 160.

The legacy computing environment 110 comprises at least a processor and memory, but generally the legacy computing environment 110 is a microprocessor or system-on-a-chip that controls the sensor.

In some embodiments, the trusted computing environment 120 is configured to communicate with control, monitoring, maintenance stations, such as the monitoring station 160, over the network 150. The trusted computing environment 120 can also evaluate raw data measurements as received from ADC 130 against processed information provided to the trusted computing environment 120 directly from the legacy computing environment 110 or by other nodes on the network such as the monitoring station 160.

Generally, the sensor system 100 can monitor the measurements of the sensor 140, detect errant functioning within the sensor system 100 that could be result of malware infection. In one embodiment, the sensor system 100 implements algorithms to detect anomalies by means of comparing raw data of the sensor 140 (digitized by ADC 130) to the processed measurements generated by the legacy computing environment 110. For example, the safety and control system 165 can receive processed sensor data from the legacy computing environment 110 and raw sensor data from the trusted computing environment 120. In one instance, the sensor is a thermocouple and the processed sensor data indicates a fairly uniform in signal that represents a consistent temperature being sensed by the thermocouple. In contrast, the raw sensor data indicates that a temperature is much higher (or lower) that the actual temperature of the area measured, which is constant. This inconsistency in processed versus raw data may indicate a problem with the processed output of legacy computing environment 110. The legacy computing environment 110 may be infected with malware or may be malfunctioning in some way or there may be a malfunction of the thermocouple.

In another example, a speed sensor generates output that is processed by a legacy computing environment 110. The legacy environment output speed is indicating that a device, such as a centrifuge, is being slowed. In contrast, the raw data indicates that the speed sensor is measuring a high speed condition in the centrifuge. A comparison between these discrepant outputs indicates a problem within the sensor system 100. These examples are meant to provide examples of how processed sensor data from a legacy computing environment 110 and raw sensor data from a trusted computing environment 120 can be contrasted and compared to detect anomalies in a sensor system that are indicative of a malfunction or malware infection of legacy computing environment 110.

In some embodiments, a network node such as the safety and control system 165 can execute one or more training programs that will refine the detection algorithms over time by such means as AI (Artificial Intelligence) and other training means.

The trusted computing environment 120 also provides a unique protected identifier of the sensor system 100 allowing for safe authentication of sensor system 100.

For example, each trusted computing environment in a network comprises an individual identifier string of characters. The identifier can be fixed or downloadable from another trusted environment. The identifier can be included in messages broadcast by the sensor system 100 to the network 150. Thus, even if the legacy computing environment 110 is infected and altering its processed information, the trusted computing environment can immediately transmit its ID to the network 150, which aids in identifying infected systems in a unique manner.

In some embodiments the trusted computing environment 120 may "clean" the legacy computing environment 110 by clearing the program in the memory 110B, and reloading a clean processing program.

Figure 2:
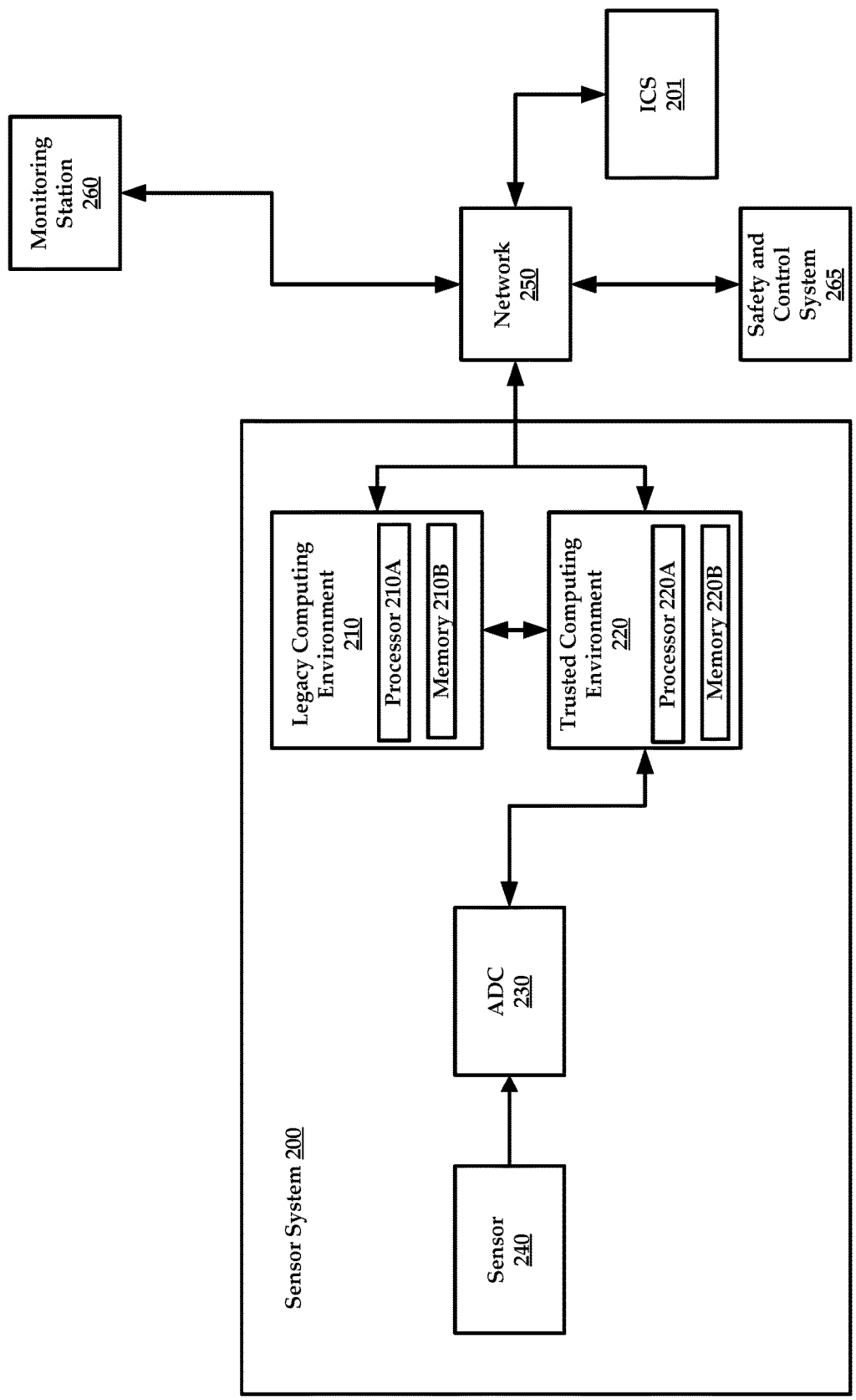
FIG. 2 is a schematic diagram of another example sensor system, constructed in accordance with the present technology.

FIG. 2 depicts another sensor system 200 architecture, constructed in accordance with the present technology. The difference between the system 200 of FIG. 2 and the system 100 of FIG. 1 is that the raw data (the measured data by sensing device 240 that is converted by means of ADC 230 to digital form) is now provided by a trusted computing environment 220 to a legacy computing environment 210. Thus, the legacy computing environment 210 is not in direct communication with the ADC 230.

In one embodiment, the memory 220B is limited in storage capacity so as to prevent the possible infection of the trusted computing environment 120 with malware. In one embodiment, the trusted environment 220 prevents access to the network 250 by the legacy computing environment 210. In another example the trusted environment 220 prevents the legacy computing environment 210 from downloading programs from the network 250, while allowing the legacy computing environment 210 to transmit data to the network 250.

In this embodiment, the trusted computing environment 220 can control data processed by the legacy computing environment 210 such as blocking raw data, inserting values, also referred to as "test input data", that will allow for testing of the legacy computing environment 210 processes, and insert values that will defeat the legacy computing environment 210 software in case of malfunction and expose the legacy computing environment 210 in case of malware infection.

In one example, if the sensor 240 is a pressure sensor, the trusted computing environment 220 can feed the legacy computing environment 210 test signals that represent a low pressure signal produced by the pressure sensor. If the legacy computing environment 210 is infected with malware or is malfunctioning, it might output processed data that indicates the pressure sensor is reading a high pressure signal. The known test signals are transmitted to the safety and control system 265 where an operator can identify the discrepancy between the test input data and the variance in output data from the legacy computing environment 210. If desired an automated process may be adopted without human interface.

The trusted environment may clean the legacy environment programs and load into its memory a clean program. In this embodiment, the ADC 130 is connected to the trusted computing environment 120 but not the legacy computing environment 110, which allows for providing the aforementioned features of the sensor system 200.

Figure 3:
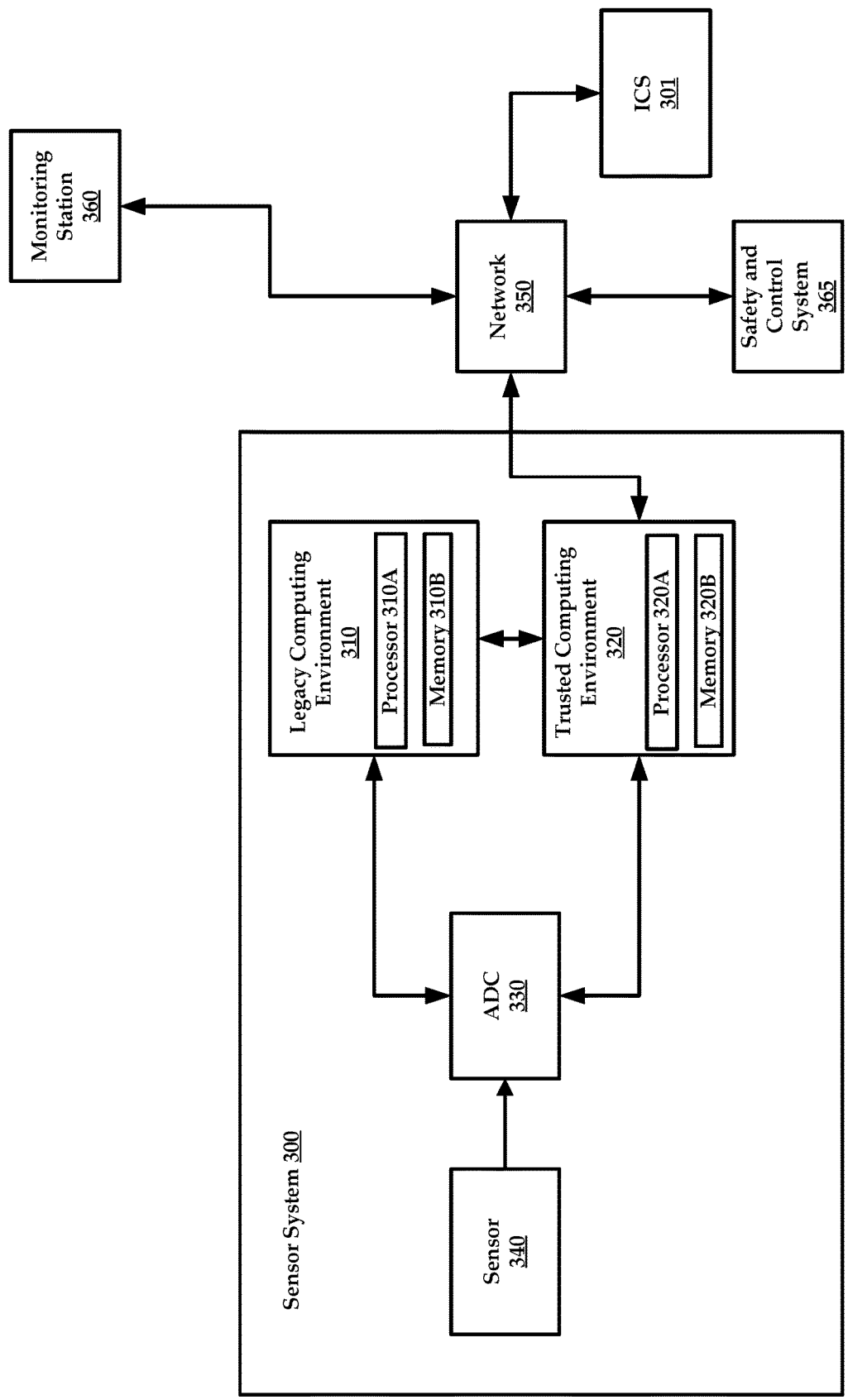
FIG. 3 is a schematic diagram of an additional example sensor system, constructed in accordance with the present technology.

FIG. 3 illustrates another example architecture of a sensor system 300 which is similar to the sensor system 100 of FIG. 1 with the exception of changes to an interface to a network 350 by the legacy computing environment 310. The connection to the network 350 of the legacy computing environment 310 occurs through the trusted computing environment 320. That is, the trusted computing environment 320 is a proxy for the legacy computing environment 310 and the monitoring station 360 and/or safety and control system 365.

The sensor system 300 allows for evaluation of raw sensor measurements as received from ADC 330 against processed information provided to the trusted computing environment 320 directly from the legacy computing environment 310. The sensor system 300 also provides direct access to the processed data of the legacy computing environment 310, allowing for simple evaluation against the raw data in the trusted computing environment 320. The sensor system 300 also provides for direct blocking of the legacy computing environment 310 if contamination of the legacy environment is detected (by any entity on the network 350)

The sensor system 300 also provides full control of the legacy computing environment 310 by the trusted computing environment 320, allowing for monitoring processes of the legacy computing environment 310, clearing memory 310B of the legacy computing environment 310, and uploading "fresh" programs to memory 310B of the of the legacy computing environment 310.

In one embodiment, a network node such as the safety and control system 365 can contain an infected sensor system by means of software to block its access to the network 350, defeating a DoS (Denial of Service) attack on the network 350 or communicating with malicious users of the network 350. The blocking is of the legacy computing environment's 310 access to the network 350. Blocking the legacy computing environment 310 may not affect the trusted computing environment 320. For example, the trusted computing environment 320 can still provide raw data to the monitoring station 360 or safety and control system 365. This way a graceful degradation in system operation may result without catastrophic damage to the ICS system 30.

Figure 4:
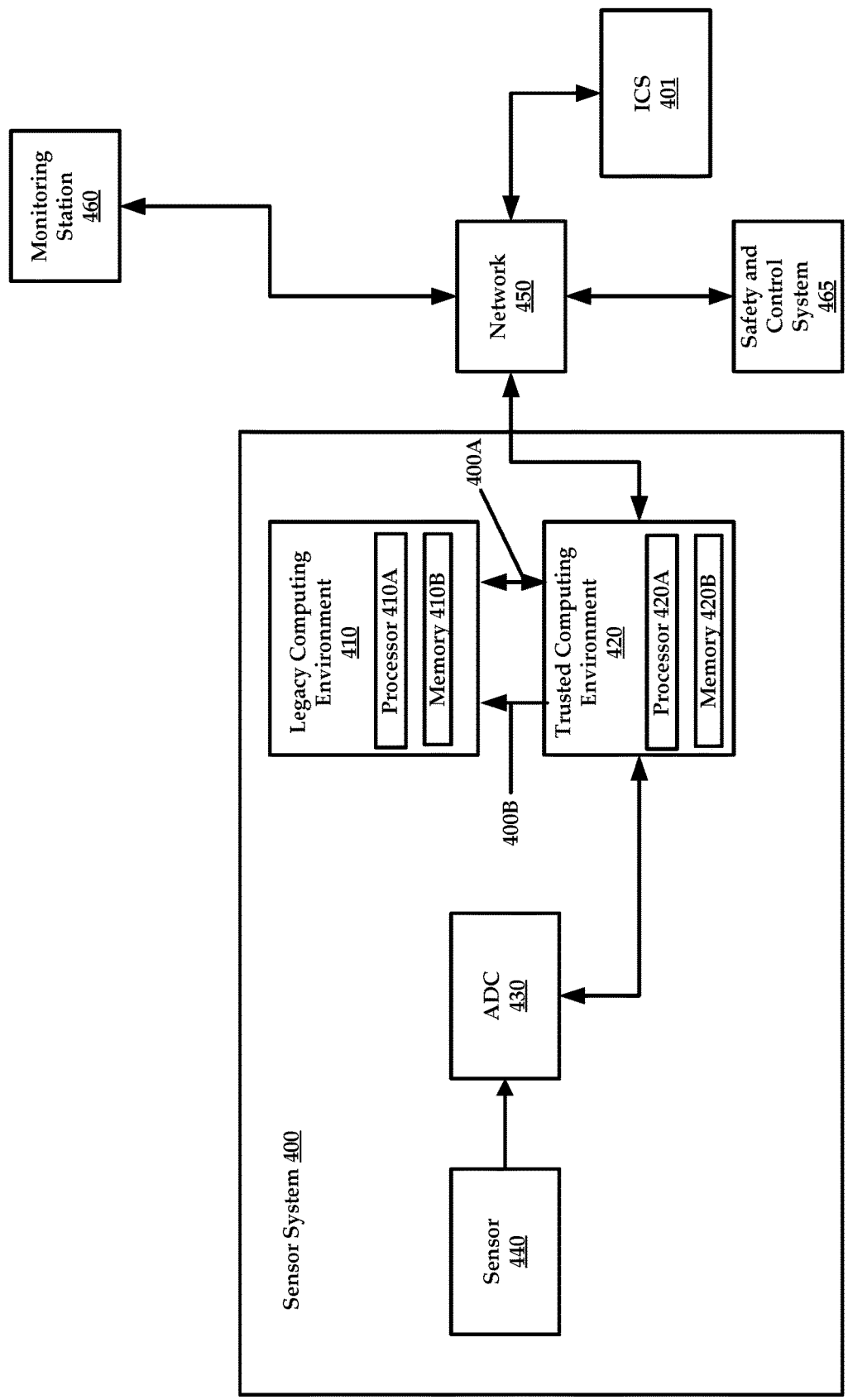
FIG. 4 is a schematic diagram of another example sensor system, constructed in accordance with the present technology.

Referring now to FIG. 4, the features of the sensor systems 100, 200, and 300, of FIGS. 1-3, respectively can be combined together into an aggregate sensor system that provides communication with control, monitoring, maintenance stations over a network as well as the evaluation of raw data measurements as received from an ADC against processed information provided to it directly from the a legacy computing environment or other network nodes that process the raw sensor output. The single sensor system can also control the data processed by a legacy computing environment by blocking the legacy computing environment, insert values that will allow for testing of the legacy computing environment processes, and insert values that will defeat the legacy computing environment software and expose it, if necessary. The sensor system also provides direct access to the processed measurements of a legacy computing environment, allowing for simple evaluation against the raw data in the trusted computing environment.

The sensor system 400 of FIG. 4 is an embodiment that combines certain features to that of FIGS. 1-3 with the exception that the legacy computing environment 410 is isolated from both the ADC 430 and the network 450. Communications paths or interfaces 400A and 400B communicatively couple the legacy computing environment 410 and the trusted computing environment 420. In some instances, the legacy computing environment 410 and the trusted computing environment 420 may couple with a bidirectional path 400A or unidirectional path 400B. For example, the trusted computing environment 420 can receive processed data from the legacy computing environment 410 using path 400B.

Full control of legacy computing environment by the trusted computing environment is contemplated, including, but not limited to monitoring processes, clearing memories, and uploading "fresh" programs. For example, the trusted computing environment 420 can provide the legacy computing environment 410 with clean program data through unidirectional path 400B.

Additionally, the sensor system by the trusted environment can generally monitor sensor measurements, detect ill functioning parts of the sensor system that could be result of malware infection, by implementing algorithms to detect anomalies by means of comparing raw data to the processed measurements provided by the sensor system. The sensor system can also implement training programs that will refine the detection algorithms over time by such means as AI (Artificial Intelligence) and other training means, as well as provide containment of an infected sensor system by means of software to block its access to the network, defeating the DoS (Denial of Service) of the network or communicating with malicious users of the network (on the network we refer to hackers). The network system may clean the legacy sensor by clearing and reloading a clean processing program.

Additional functionalities include, detection of malfunctioning of a sensor, detection of malware presence and defeating the malware operator, testing of the sensor, effective offloading detection algorithms and processes from the network system by distributing effectively to the sensor systems, blocking of the legacy computing environment that simplifies the control of the sensor system output to the network and makes it efficient, and simple and effective recovery from contamination of a legacy computing environment.

Figure 5:
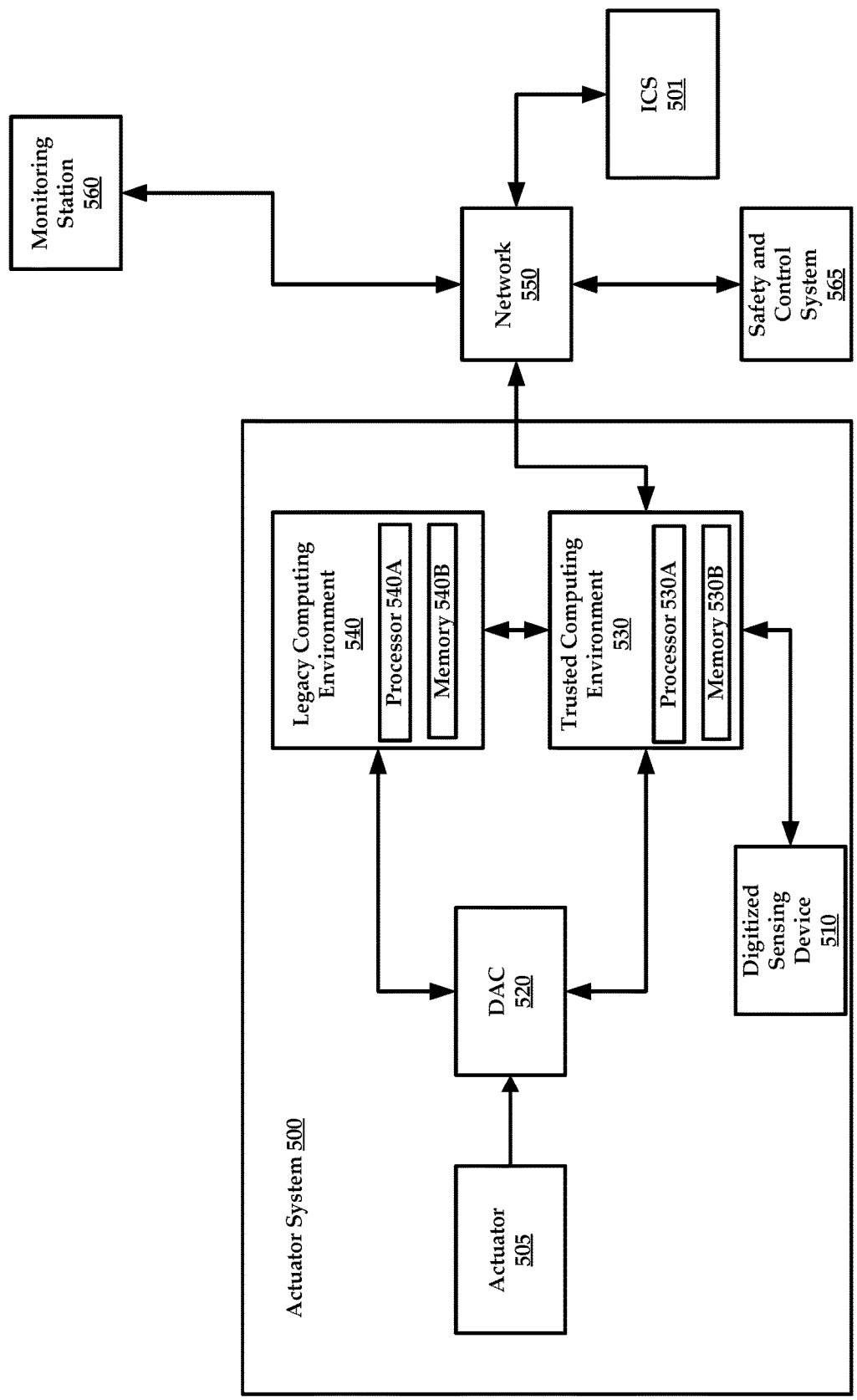
FIG. 5 is a schematic diagram of an example actuator system.

FIG. 5 is an example actuator system 500. The actuator system 500 comprises an actuator 505, a digitized sensing device 510, a digital to analog converter (DAC) 520, a trusted computing environment 530, a legacy computing environment 540, a network 450, a monitoring station 560, and a safety and control system 565.

In general, the trusted computing environment 530 allows for the detection of malfunctioning (or malware infected) components of the actuator system 500. It is possible to get a variety of architectures, as was presented with the sensor systems embodiments of FIGS. 1-4, although the actuator system 500 will only be described for purposes of brevity. Nevertheless, the variation in legacy and trusted computing environment configurations found in the systems of FIGS. 1-4 are equally applicable to the actuator system 500.

The legacy computing environment 540 calculates control values (e.g., commands or test input) for the actuator 505 by means of the DAC 520 response to analog values, transferred to the actuator 505 by the DAC 520. The actuator 505 response is measured by the digitized sensing device 510. In one embodiment, the actuator 505 is a servo which requires complex computation procedures. The servo can be upgraded and modified by means of the network 550, for example by receiving upgrades from the safety and control system 565. The upgrade and modifications to the servo control processes involve the storing of the upgrades in the legacy computing environment memory 540B. It will be understood that these upgrade/modification routines may infect the legacy computing environment 540. Adding a trusted computing environment 530, that fully controls the data transfers to and from the legacy computing environment 540 will reduce or eliminate the malware impact.

The trusted computing environment 530 also provides for evaluation of raw data measurements as received from digitized sensing device 510 that measures the actuator 505 action against commands sent from the network 550 via the trusted computing environment 530 to legacy computing environment 540, allowing for detection of legacy computing environment 540 contamination.

The trusted computing environment 530 also controls the data processed by the legacy computing environment 540 by blocking the data, inserting values that will allow for testing of the legacy computing environment 540 processes, and inserting values that will defeat the contaminated legacy computing environment 540 software.

The trusted computing environment 530 also has access to the actuator 505 actions and the commands used to control the legacy computing environment 540, allowing for detection of malware (malfunction) in the legacy computing environment 540. The trusted computing environment 530 provides full control of the legacy computing environment 540 by the trusted computing environment 530.

This actuator system 500 could support the following functions with regard to the actuator 505: (1) monitoring of the actuator action; (2) detecting ill functioning actuator system components that could be result of malware infection, by implementing algorithms to detect anomalies by means of comparing raw data to the processed commands provided by the actuator system; (3) detecting deviation of expected actions from actual actions by the actuator 505; (4) providing a unique protected identifier of the actuator system, allowing for safe authentication of sensor system; (5) cleaning of the legacy computing environment 540 by clearing and reloading the memory 540B of the legacy computing environment 540 with a clean processing program. Based on specific design and limits of the legacy computing environment 540, this could be achieved via the network 550.

FIG. 6 illustrates an example industrial control system (ICS), architecture 600 of an example of a networked computing system that includes components secured using secured architecture for computing systems as described here as well as in U.S. patent application Publication Ser. No. 14/040,352, which is hereby incorporated by reference herein in its entirety. Again, it is advantageous to separate I/O (Input and Output) from parts of the system 600 that may be contaminated with malware (or at least provide a separate secured authentication channel). To clarify, the ICS represents in general any conceivable automated or semi-automated system such as and not limiting to: Machine to machine communication, Smart grid, nuclear reactors, water treatment facilities, transportation, security systems, robot networks, medical equipment, advanced cars, home automation, and other devices and systems which are part of the Internet of Things (IoT).

I/O is connected directly to the trusted environments added to each component and downloads are made to the legacy part of the systems. For example, the secured PC 610 includes a trusted environment 611 and a legacy environment 612. In the fully secured architecture, all (or a portion) of system components have a trusted environment. The communication between the various computing systems (in the example we have five systems 610-650, which represented a variety of different types of systems. The system may include numerous systems, even thousands, of various types of systems) is made by means of the trusted environments of the individual computing systems. Any of the systems 610-650 can be referred to generally as a "network node".

It is important to realize that better security is gained even if not all the system computing units are secured with a trusted environment, 611, 621, 631, 641, and 651, respectively The ICS system 600 is a networked system that allows its components, such as a monitoring station 610, maintenance station 620, secured PLC (programmable logic controller) 630, secured sensor 640, and secured actuator 650, to be controlled and secured using the trusted environments added to each component of the networked system: 611, 621, 631, 641, and 651 respectively.

Instructions stored in components that are added to the maintenance and monitoring stations (that may be constructed as PC and/or server(s)) will allow for the functions: (1) Monitoring; (2) Detection; (3) Containment; (4) Blocking; (5) Recovery; and (6) Testing. The instructions could reside in a secured server (that may be a component of the monitoring station 610) that collects raw data and processed data from the secured sensor 640 and the secured actuator 650. Components of it may be distributed in the endpoint systems such as the secured sensor 640 or the secured actuator 650.

An example monitoring function is implemented by seeking discrepancies between processed values and raw data (transmitted directly by the trusted environment) that are generated in the secured sensor 640 and in the secured actuator 650. When found, a process of validation is activated that allows for the detection of malware presence. The detection process is looking at details of the discrepancy between raw data and processed measured values or commands.

The processing of the raw data by the secured sensor 640 is designed to optimize system operation in terms of reaction and saving of resources. Contamination of such process by malware to provide erroneous input to the ICS 600 causes undesired actions or neglect of action. Identifying malware presence (or sensor processing malfunction) will allow for defeat of the malware. Algorithms that allow for such action involve the probability of contaminated processes when certain values of raw data are measured. For example, a range of values for raw data may have three zones, based on potential unrecoverable damage: (i) a Green Zone: High probability of no damage; (2) a Yellow Zone: High probability of recoverable damage; and (3) a Red Zone: High probability for damage.

This stratification or categorization of probable dangers allows for avoiding damage by contaminated by legacy computing environment software (or contamination of the processed data by a infected network node). The discrepancy between a command to the secured actuator 650 and the actual action will allow for overcoming contamination of the actuator software by transferring the uncontaminated command directly to the actuator by means of the trusted environment.

Identifying the source of contamination as well as altered data of sensors allows for containing malware by "soft" blocking of its access to a network. This contaminated data can also be blocked from used in data fusion processes where several sources of data are used to determine state of system and required action. The ICS system 600 is also configured for effectively blocking the source of contamination using trusted environments.

Full recovery of the secured sensor 640 or secured actuator 650 can be accomplished by clearing the legacy sensor software (or actuator) and replacing it with a clean version of the software. It will also enable safe upgrade and various modes change via the trusted environments.

Figure 7:
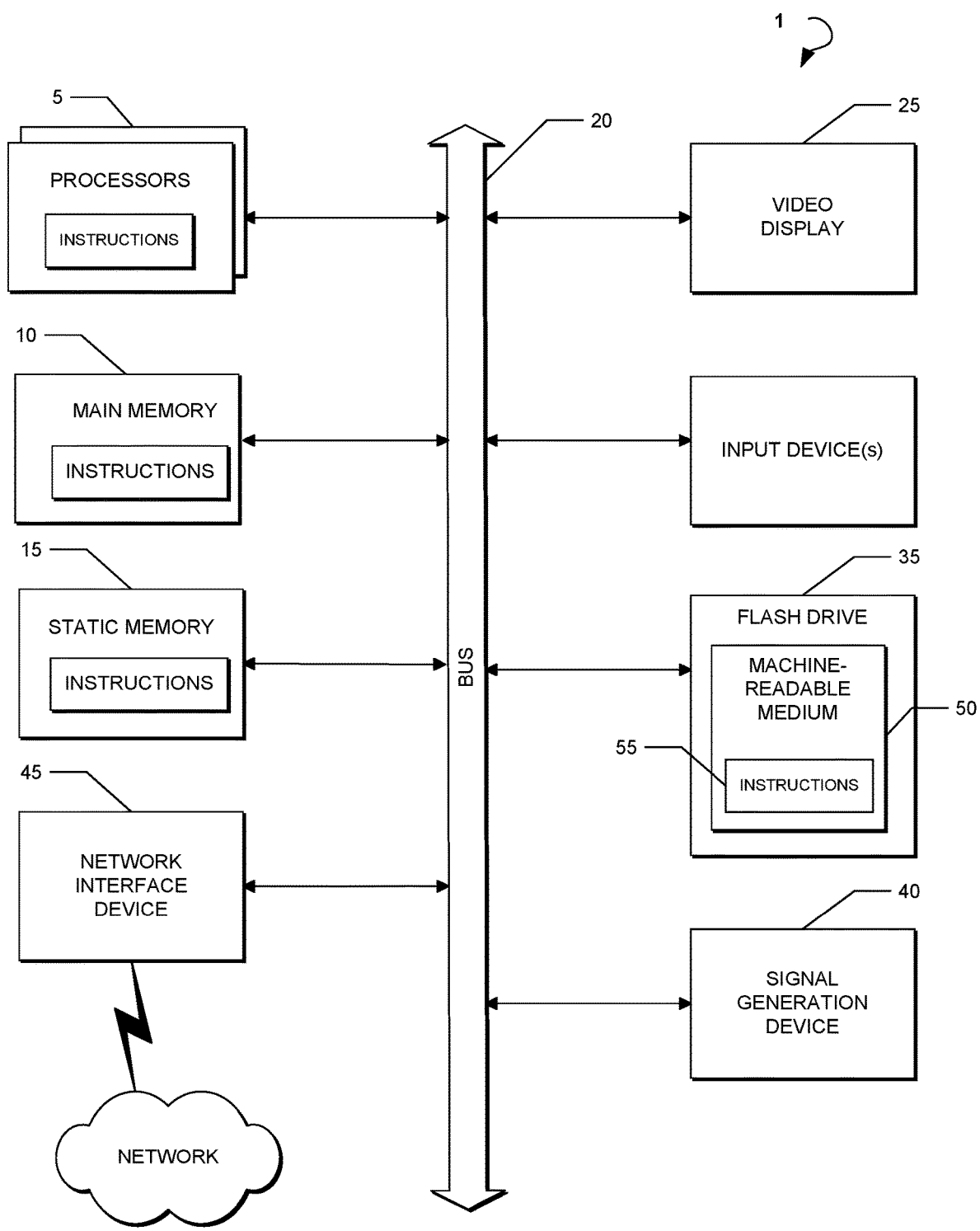
FIG. 7 is a schematic diagram of an example computing system (machine), parts of which, or the entirety, can be used to implement aspects of the present technology.

FIG. 7 is a diagrammatic representation of an example machine in the form of a computing system 1, within which a set of instructions for causing the machine to perform any one or more of the methodologies discussed herein may be executed. The computing system 1 can be used one or more of the components of the ICS in FIG. 6. Also, parts of the computing system 1, such as the CPU 5 and memory 10 can be used in both legacy and trusted computing environments.

In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 1 includes a processor or multiple processors 5 (e.g., a central processing unit (CPU), a graphics processing unit (GPU), or both), and a main memory 10 and static memory 15, which communicate with each other via a bus 20. The computing system 1 may further include a video display 35 (e.g., a liquid crystal display (LCD)). The computing system 1 may also include an alpha-numeric input device(s) 30 (e.g., a keyboard), a cursor control device (e.g., a mouse), a voice recognition or biometric verification unit (not shown), a drive unit 35 (also referred to as disk drive unit), a signal generation device 40 (e.g., a speaker), and a network interface device 45. The computing system 1 may further include a data encryption module (not shown) to encrypt data.

The disk drive unit 35 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computing system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing systems that are coupled to the Internet service, and that the computing systems may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A sensor processing program integrity test method comprising:

receiving, at a first data processor, raw sensor data signals representing raw sensor data from a sensor;

generating, by the first data processor, processed sensor data by processing the raw sensor data signals said representing raw sensor data;

receiving, at a second data processor, where the second data processor is physically separated from the first data processor, the raw sensor data signals representing raw sensor data from a sensor;

wherein the raw sensor data signals are received at the second data processor by a pathway that does not include said first data processor;

determining at the second data processor, the second data processor monitoring the raw sensor data, whether a discrepancy exists between the raw sensor data signals representing raw sensor data from a sensor and the processed sensor data by comparing the raw sensor data and the processed sensor data received; and generating an indication or alert if a discrepancy is detected.

* * * * *